(12) United States Patent
Liedes et al.

(10) Patent No.: US 10,841,840 B2
(45) Date of Patent: Nov. 17, 2020

(54) PROCESSING PACKETS IN A COMPUTER SYSTEM

(71) Applicant: SSH Communications Security OYJ, Helsinki (FI)

(72) Inventors: Antti-Pekka Liedes, Helsinki (FI); Markus Stenberg, Helsinki (FI)

(73) Assignee: SSH Communications Security OYJ, Helsinki (FI)

( * ) Notice: Subject to any disclaimer, the term of this patent is extended or adjusted under 35 U.S.C. 154(b) by 0 days.

(21) Appl. No.: 16/289,771

(22) Filed: Mar. 1, 2019

(65) Prior Publication Data

US 2019/0297533 A1  Sep. 26, 2019

(30) Foreign Application Priority Data

Mar. 2, 2018  (GB) .................................. 1803432.2

(51) Int. Cl.
*G06F 11/00* (2006.01)
*H04W 28/10* (2009.01)
*H04L 1/16* (2006.01)
*H04L 29/06* (2006.01)
*H04L 12/801* (2013.01)

(52) U.S. Cl.
CPC ........... *H04W 28/10* (2013.01); *H04L 1/1642* (2013.01); *H04L 29/06* (2013.01); *H04L 47/14* (2013.01); *H04L 69/04* (2013.01); *H04L 69/161* (2013.01)

(58) Field of Classification Search
CPC ...... H04W 28/10; H04L 69/161; H04L 69/04; H04L 47/14; H04L 29/06; H04L 1/1642; H04L 63/1466; H04L 63/166

USPC .............................................. 370/235, 235.1
See application file for complete search history.

(56) References Cited

U.S. PATENT DOCUMENTS

| 9,065,701 | B2* | 6/2015 | Janakiraman | H04L 47/122 |
| 9,413,720 | B1 | 8/2016 | Parviainen-Jalanko et al. | |
| 2014/0157365 | A1* | 6/2014 | Janakiraman | H04L 47/122 726/3 |
| 2014/0181967 | A1 | 6/2014 | Dondet et al. | |
| 2016/0277358 | A1* | 9/2016 | Ambati | H04L 63/0272 |
| 2017/0264600 | A1* | 9/2017 | Froelicher | H04L 63/062 |
| 2019/0166109 | A1* | 5/2019 | Wang | H04L 63/06 |

FOREIGN PATENT DOCUMENTS

GB  2423220 A  8/2006

OTHER PUBLICATIONS

Search Report of the Intellectual Property Office of United Kingdom, Application No. GB1803432.2 ,dated Aug. 13, 2018, 3 pages.

* cited by examiner

*Primary Examiner* — Chuong T Ho
(74) *Attorney, Agent, or Firm* — Ziegler IP Law Group, LLC

(57) ABSTRACT

There is provided a method for determining a sequence number for transmitting a packet from a first apparatus to a second apparatus as part of a flow of packets, determining a flow identifier for identifying a security association for the flow, wherein the flow identifier is determined in dependence on the sequence number, and transmitting the packet includes transmitting the sequence number and the flow identifier to the second apparatus.

17 Claims, 6 Drawing Sheets

| Core A | Packet stream (lowest 4 bits of sequence number) | Core B |
|---|---|---|
| 000n | <- 000\|0 | |
| | 000\|1 -> | 000n |
| 001n | <- 001\|0 | |
| | 001\|1 -> | 001n |
| 010n | <- 010\|0 | |
| | 010\|1 -> | 010n |
| 011n | <- 011\|0 | |
| | 011\|1 -> | 011n |
| 100n | <- 100\|0 | |
| | 100\|1 -> | 100n |
| 101n | <- 101\|0 | |
| | 101\|1 -> | 101n |
| 110n | <- 110\|0 | |
| | 110\|1 -> | 110n |
| 111n | <- 111\|0 | |
| | 111\|1 -> | 111n |

Fig. 3

```
Core A            Packet stream            Core B
                  (lowest 4 bits of
                   sequence number)
000n         <-    000|0
                   000|1    ->             000n
001n         <-    001|0
                   001|1    ->             001n
010n         <-    010|0
                   010|1    ->             010n
011n         <-    011|0
                   011|1    ->             011n
                   001|1    ->             001n
100n         <-    100|0
                   100|1    ->             100n
101n         <-    101|0
                   101|1    ->             101n
110n         <-    110|0
                   110|1    ->             110n
111n         <-    111|0
                   111|1    ->             111n
```

Fig. 4

PROCESSING PACKETS IN A COMPUTER SYSTEM

FIELD

This disclosure relates to methods, apparatuses and computer programs. In particular, the following disclosure relates to distribution of packets in a flow.

BACKGROUND

Data is communicated in computerized systems in data packets. Data packets communicated in a computerized system may need to be checked for various reasons. For example, some of the packets can be malicious, and can cause various degrees of harm to a recipient who receives and processes such a packet. The harm can be from minor nuisance to serious security, financial and/or other risks. Therefore various ways to detect suspicious packets before they are processed further by a recipient have been developed.

Replay attacks are one form of malicious activities taking place, e.g., in the Internet. In a replay attack a data transmission from a source to a destination is maliciously or fraudulently repeated or delayed. It is an attempt to subvert security by someone who repeats communication of packets, for example in order to impersonate a valid user, and to disrupt or cause negative impact for legitimate connections. A particular example is a denial-of-service (DoS) attack.

Anti-replay methods have been developed to address replay attacks. An example of attempt to standardise anti-replay is the anti-replay service of IPsec (Internet Protocol Security). IPsec is a protocol suite for securing Internet Protocol (IP) as standardized by the Internet Engineering Task Force (IETF). Anti-replay aims to prevent attackers injecting packets in communications from source to destination. Anti-replay can be implemented by using a unique packet sequence number series per unidirectional security association (SA) established between two nodes of a network. Once a secure connection is established, the anti-replay protocol uses a packet sequence number or a counter to verify the legitimacy of the transmission. When the source sends a message, it adds a sequence number to the packet and increments the sequence number every time it sends another message. The destination receives the message and keeps a history of the sequence numbers and determines possibility of an attack based on a comparison of the sequence numbers.

Implementation of anti-replay protection requires maintaining a 'global' lower bound of a window for any given SA. If a message has a lower or equal number than the previous message or if the message is below the lower bound, the packet is dropped as suspicious. If the number is larger than the previous one, it is kept and the number thereof is shifted to be the new number and so forth.

Anti-replay protection can be provided for example is association with Encapsulating Security Payload (ESP) operation. The ESP is a member of the Internet Protocol Security (IPsec) protocol suite where it is used to provide origin authenticity, integrity and confidentiality protection of data packets. A security parameter index (SPI) is used to identify the unidirectional SA, the sequence number being then in the next field of an ESP packet header.

Anti-replay protection can cause a bottleneck, especially if parallelisation of packet decapsulation is provided. This can occur, e.g., in keyed-hash message authentication code (HMAC) checking and decryption. HMAC is a specific construction for calculating a message authentication code (MAC) involving a cryptographic hash function in combination with a secret cryptographic key. Even if several cores are provided for parallel processing of the packets, the anti-replay check is based on a window where the packets are checked one at the time whilst the other packets are "locked". Such bottleneck can considerably slow down processing of the received packets.

It is noted that the above discussed issues are not limited to any particular system and data processing apparatus but may occur in any system where sequence number checking may be needed.

Embodiments of the disclosure aim to address one or several of the above issues.

SUMMARY

According to an aspect, there is provided a method comprising: determining a sequence number for transmitting a packet from a first apparatus to a second apparatus as part of a flow of packets; determining a flow identifier for identifying a security association for the flow, wherein the flow identifier is determined in dependence on the sequence number; and transmitting said packet comprising the sequence number and the flow identifier to the second apparatus.

According to a more specific aspect, determining a flow identifier may comprise setting the n least significant bits of the flow identifier as a function of the n least significant bits of the sequence number. The method may further comprise determining n, wherein n is a function of a number of independent processing entities in the second apparatus that are arranged to process the flow.

Determining a flow identifier may comprise setting the n least significant bits of the flow identifier as a function of the n most significant bits of the sequence number.

Determining a flow identifier may comprise determining the flow identifier in dependence on an original identifier of the security association that was determined when the security association was initialised.

According to an aspect, there is provided a method comprising: receiving a first packet as part of a flow of packets between a first apparatus and a second apparatus, wherein said first packet comprises a sequence number and a flow identifier for identifying a security association for the flow, wherein the flow identifier is a function of the sequence number; and selecting a processing entity of the second apparatus for processing the first packet in dependence on the flow identifier.

The n least significant bits of the sequence number may be a function of the n least significant bits of the flow identifier. Said selecting may comprise selecting a processing entity out of n independent processing entities in the second apparatus that are arranged to process the flow. When the second apparatus comprises the selected processing entity, the method may further comprise: receiving a second packet as part of the flow of packets, wherein said second packet comprises a sequence number and a flow identifier for identifying the security association, wherein the flow identifier of the second packet is a function of the sequence number of the second packet; selecting the processing entity of the second apparatus for processing the second packet in dependence on the flow identifier; and checking, by the selected processing entity, all bar the n least significant bits of the sequence number comprised within the first packet to all bar the n least significant bits of the sequence number comprised within the second packet.

The n most significant bits of the sequence number may be a function of the n least significant bits of the flow identifier.

Said flow identifier of the first packet may be a function of an original identifier of the security association that was determined when the security association was initialised.

According to an aspect, there is provided an apparatus comprising: at least one processor and at least one memory comprising computer code that, when executed by the at least one processor, causes the processor to: determine a sequence number for transmitting a packet from a first apparatus to a second apparatus as part of a flow of packets; determine a flow identifier for identifying a security association for the flow, wherein the flow identifier is determined in dependence on the sequence number; and transmit said packet comprising the sequence number and the flow identifier to the second apparatus.

The causing of a flow identifier to be determined may be caused by the code further causing the apparatus to set the n least significant bits of the flow identifier as a function of the n least significant bits of the sequence number. The apparatus may further be caused to determine n, wherein n is a function of a number of independent processing entities in the second apparatus that are arranged to process the flow.

The causing of a flow identifier to be determined may be caused by the code further causing the apparatus to set the n least significant bits of the flow identifier as a function of the n most significant bits of the sequence number.

The causing of a flow identifier to be determined may be caused by the code further causing the apparatus to determine the flow identifier in dependence on an original identifier of the security association that was determined when the security association was initialised.

According to an aspect, there is provided an apparatus comprising: at least one processor and at least one memory comprising computer code that, when executed by the at least one processor, causes the processor to: receive a first packet as part of a flow of packets between a first apparatus and a second apparatus, wherein said first packet comprises a sequence number and a flow identifier for identifying a security association for the flow, wherein the flow identifier is a function of the sequence number; and select a processing entity of the second apparatus for processing the first packet in dependence on the flow identifier.

The n least significant bits of the sequence number may be a function of the n least significant bits of the flow identifier. Said selecting may be caused by the apparatus being caused to select a processing entity out of n independent processing entities in the second apparatus that are arranged to process the flow. When the second apparatus comprises the selected processing entity, the apparatus may further be caused to: receive a second packet as part of the flow of packets, wherein said second packet comprises a sequence number and a flow identifier for identifying the security association, wherein the flow identifier of the second packet is a function of the sequence number of the second packet; select the processing entity of the second apparatus for processing the second packet in dependence on the flow identifier; and check, by the selected processing entity, all bar the n least significant bits of the sequence number comprised within the first packet to all bar the n least significant bits of the sequence number comprised within the second packet.

The n most significant bits of the sequence number may be a function of the n least significant bits of the flow identifier.

A flow identifier of the first packet may be a function of an original identifier of the security association that was determined when the security association was initialised.

According to an aspect, there is provided an apparatus comprising: means for determining a sequence number for transmitting a packet from a first apparatus to a second apparatus as part of a flow of packets; means for determining a flow identifier for identifying a security association for the flow, wherein the flow identifier is determined in dependence on the sequence number; and means for transmitting said packet comprising the sequence number and the flow identifier to the second apparatus.

Means for determining a flow identifier may comprise means for setting the n least significant bits of the flow identifier as a function of the n least significant bits of the sequence number. The apparatus may further comprise means for determining n, wherein n is a function of a number of independent processing entities in the second apparatus that are arranged to process the flow.

Means for determining a flow identifier may comprise means for setting the n least significant bits of the flow identifier as a function of the n most significant bits of the sequence number.

Means for determining a flow identifier may comprise means for determining the flow identifier in dependence on an original identifier of the security association that was determined when the security association was initialised.

According to an aspect, there is provided an apparatus comprising: means for receiving a first packet as part of a flow of packets between a first apparatus and a second apparatus, wherein said first packet comprises a sequence number and a flow identifier for identifying a security association for the flow, wherein the flow identifier is a function of the sequence number; and means for selecting a processing entity of the second apparatus for processing the first packet in dependence on the flow identifier.

The n least significant bits of the sequence number may be a function of the n least significant bits of the flow identifier. Said means for selecting may comprise means for selecting a processing entity out of n independent processing entities in the second apparatus that are arranged to process the flow. When the second apparatus comprises the selected processing entity, the apparatus may further comprise: means for receiving a second packet as part of the flow of packets, wherein said second packet comprises a sequence number and a flow identifier for identifying the security association, wherein the flow identifier of the second packet is a function of the sequence number of the second packet; means for selecting the processing entity of the second apparatus for processing the second packet in dependence on the flow identifier; and means for checking, by the selected processing entity, all bar the n least significant bits of the sequence number comprised within the first packet to all bar the n least significant bits of the sequence number comprised within the second packet.

The n most significant bits of the sequence number may be a function of the n least significant bits of the flow identifier.

A flow identifier of the first packet may be a function of an original identifier of the security association that was determined when the security association was initialised.

According to an aspect, there is a provided a computer program comprising computer executable instructions, which when executed by a computer, causes the computer to perform the steps of any method disclosed herein.

SUMMARY OF THE DRAWINGS

Various exemplifying embodiments of the disclosure are illustrated by the attached drawings. Steps and elements may be reordered, omitted, and combined to form new embodiments, and any step indicated as performed may be caused to be performed by another apparatus or module. In the Figures

FIG. 3 shows an example of how sequence numbers of packets can be divided into analysis windows;

FIG. 4 shows an example of how sequence numbers of packets can be divided into analysis windows;

DETAILED DESCRIPTION

The following relates to examples of mechanisms for distributing received packets in a flow of packets to independent processing entities for processing. The flow of packets may be processed in parallel by the independent processing entities for a variety of different purposes, such as, for example, decryption and replay window checking (examples of these operations are discussed further below).

Figure 1:
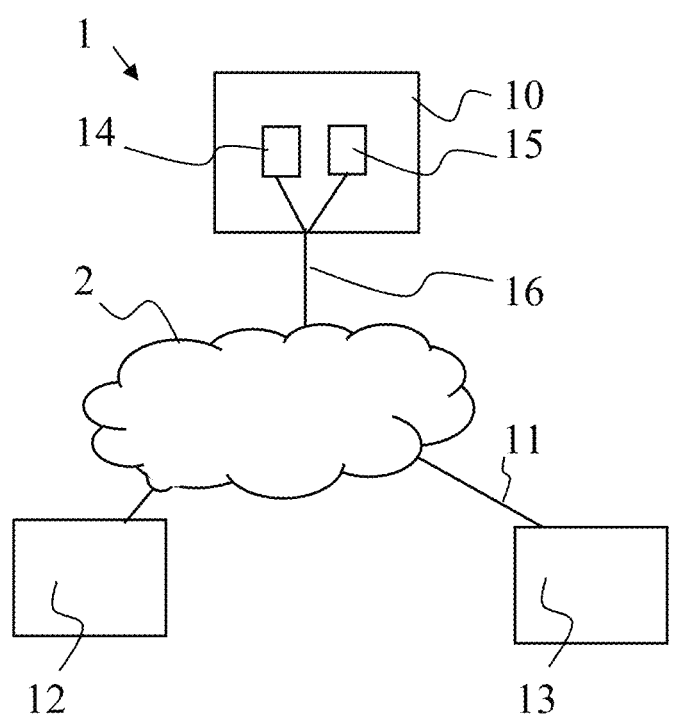
FIG. 1 illustrates an example of a computer network where the invention can be embodied.

FIG. 1 shows an example of a computerized system 1 in which the herein described principles may be embodied. The system comprises a data network 2 via which apparatuses connected thereto may communicated with each other. The data network can comprise a large network such as an Internet Protocol (IP) based global network system or be provided in e.g. a closed Intranet of an enterprise or similar organisation. Communications between the various entities can be based on e.g. an IPv4 (Internet Protocol version 4) or IPv6 (Internet Protocol version 6).

The exemplifying arrangement of FIG. 1 shows three computer apparatuses 10, 12 and 13 connected to the data network 2. These can be any appropriate computer apparatuses adapted for data communications. For example, the apparatuses can comprise user apparatuses such as mobile or desktop terminals, servers, or machine type apparatuses. An apparatus can communicate data packets with other apparatuses connected to the system. Packet switched communication links to the network 2 are illustrated by lines 11.

Numeral 16 is used to denote a stream of packets received by apparatus 10. The apparatus can receive data packets from various sources. Some of the packets can be malicious. Therefore mechanisms have been developed to detect suspicious packets from the received stream of data.

An apparatus (whether transmitting packets or receiving packets) can be provided with a plurality of processing cores for performing transmit/receive operations.

In FIG. 1 apparatus 10 is shown to comprise two cores 14 and 15. However, a larger number of cores can be provided, depending on the application. A core refers to a processing entity that can provide independent data processing. A data processor can be configured to provide several independent data processing entities, and thus several cores. These may be termed as parallel core processing entities, as they independently process data in parallel to each other. The flow of packets may thus be processed in parallel by the independent processing entities/cores for a variety of different purposes, such as, for example, decryption and replay window checking (discussed further below).

As an example, the data may be received as a stream/flow of ESP data packets. A format of an ESP data packet is illustrated with respect to FIG. 2.

Figure 2:
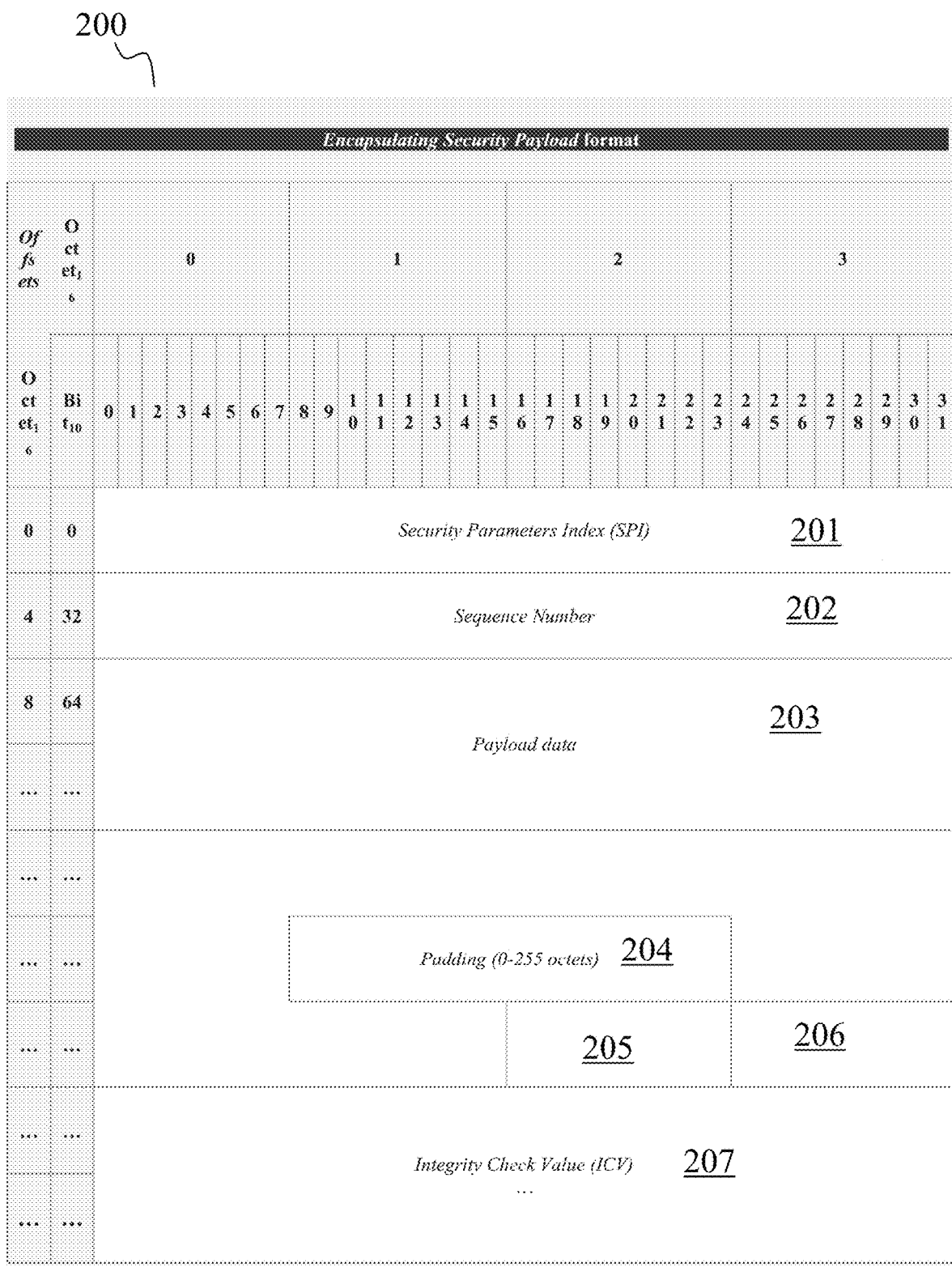
FIG. 2 shows fields in an Encapsulating Security Payload format.

FIG. 2 illustrates a transmitted data packet format 200, which comprises the following fields: a Security Parameters Index (SPI) field 201, a sequence number field 202, a payload data field 203, a padding field 204, a pad length field 205, a next header field 206 and an integrity check value field 207.

The SPI 201 is a 32 bit arbitrary value that is usable (with a source and destination IP address of the packet) to identify the security association of the receiving party. A security association relates to the establishment of shared security attributes between two network entities to support secure communication. These shared security attributed may include any of: a cryptographic algorithm; a traffic encryption key; and parameters for the network data to traverse the connection between the communicating entities.

The sequence number 202 is a 32 bit monotonically increasing sequence number (i.e. a number that is increased by 1 for every packet sent) that may be used to help protect against replay attacks, as described below.

The payload data 203 may have a variable length and comprises protected contents of the original IP packet, including any data used to protect the contents (such as an Initialisation Vector for the cryptographic algorithm). The type of content that is protected is indicated by the Next Header field.

The padding 204 may be between 0 and 255 octets and is used for encryption, to extend the payload data to a size that fits the encryption's cipher block size, and/or to align the next field.

The pad length 205 is 8 bits long and indicates the size of the padding.

The Next Header 206 is 8 bits long and indicates the type of the content that's been encrypted. The value is taken from a list of IP protocol numbers.

The Integrity Check value 207 is a multiple of 32 bits in length. It may comprises padding to align the field to an 8-octet boundary for IPv6, or a 4-octet boundary for IPv4.

The example of parallel processing packets for replay window checks will now be considered. However, it is understood that the same principles may apply in respect of other parallel processing functions, such as, for example, decryption.

When packets are received as a stream/flow of data, checks of the sequence number may be made in order to determine whether or not a received packet of the flow is suspicious (e.g. whether or not a replay attack is likely to have occurred). The checks may be made in a check window. A check window is a length over which a processing entity analyses data. In the present example, a sequence number (or a portion, less than 1, thereof) may be checked. The check window may have a smaller length than that of the sequence number/the data being checked. Therefore, less than the 32 bits of the sequence number may be checked. The check window may be used for determining whether or not a received packet is suspicious, and so may indicate an incidence of a replay attack.

An example where two parallel core processing entities, termed Core A and Core B, are provided with a respective check windows is illustrated in FIG. 3.

In the example of FIG. 3, the check window has a length of 3 whilst a single value indicates whether or not processing is to be performed by Core A or Core B, and so the lowest four bits of the sequence number of an incoming packet is considered. The lowest four bits of an incoming packet stream are shown in the middle column. Based on the lowest bit (0 or 1) the four lowest bits are placed in the check window of Core A, if the lowest bit is 0, or Core B, if the lowest bit is 1. The core can be configured to be capable of ignoring (dropping) all packet with the lowest bit(s) not matching its own core index. In FIG. 3 this is denoted by marking the lowest bit by 'n'. Each core can then analyse in parallel the three bits (i.e. excluding the bit that is used to distribute the packet to a particular core) in their respective check windows to see if the sequence numbers are in ascending order.

In FIG. 3, data packets in each window appear to arrive in correct order, i.e. the analysed parts of the lowest bits are in ascending order for bits Core A and Core B. FIG. 4 shows instead a scenario where one of the sequence numbers (emphasized in bold) with four lowest bits 0011 is received twice. The $2^{nd}$ reception of 0011 can be considered as taking place incorrectly as the value of the analysed lowest bits (001) is out of place from the otherwise ascending order of sequence numbers of the Core B window.

More particularly, the lowest bit of the sequence number (bit value 0011) is 1, so the number belongs to the window of Core B. In the Core B window the lowest bit is then ignored and the three remaining bits 001 are used in analysis as the basis of comparison to at least one other sequence number in the window. The three bits 001 of the second instance of this packet indicate a lower sequence number than the three bits 011 of the preceding sequence number, wherefrom it can be determined that this packet was received too late/is out of order and is therefore suspicious. A packet that is suspicious may indicate a replay attack is being used. Therefore, this mechanism may be used to detect a replay attack.

In response to determining that a packet is received too late/is out of order, typically the decision what to do would be to drop the packet.

At the same time in FIG. 4, Core A also analyses packets with 0 as the lowest bit of the sequence number in its check window. Thus two parallel check operations can be is provided. For Core A, all packets appear to be arriving in correct order.

The same principles can be applied to a larger number of cores. For example, if four cores A-D are used, each having its own check window, the distribution to these windows can be based on the lowest two bits of the sequence number e.g. as follows:

00→Core A
01→Core B
10→Core C
11→Core D

A larger number of cores, e.g. 8, 16, 32 . . . can be employed accordingly.

Each processor entity for parallel processing of, for example packet decapsulation of received packets in a flow of packets, can be provided with its own window and parallel check processing. This may not be necessary in all applications and, for example, thirty two (32) decapsulation processor entities may be provided with 16, 8, 4 or 2 check windows, depending on the application.

Figure 5:
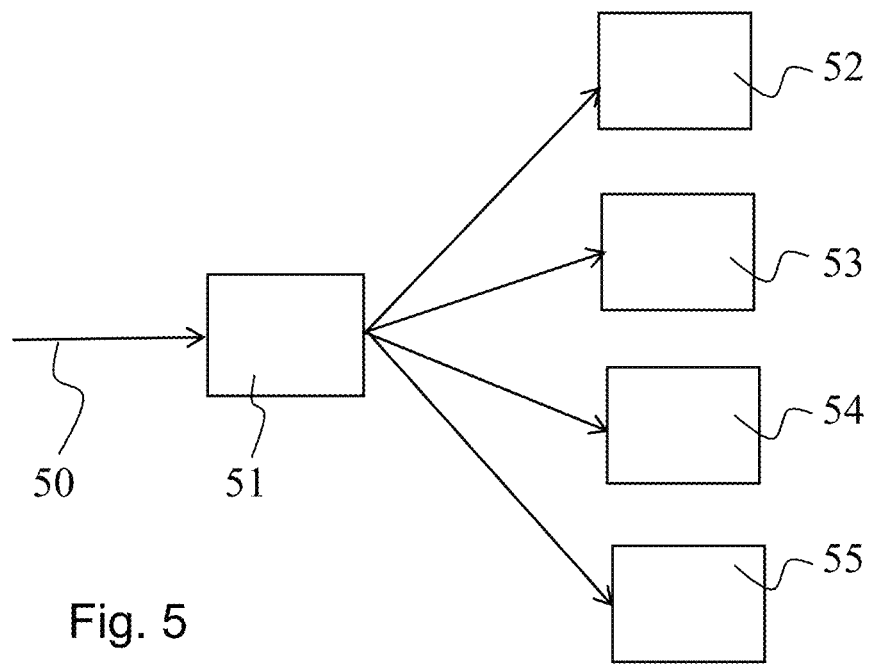
FIG. 5 shows another example of network nodes for processing a data stream.

In the above the checking is distributed between cores. The same approach can be used to distribute processing over multiple network nodes. Thus, instead of a core scenarios are also possible where there is for example a load balancer or another packet stream distributor in front of a multiple of network nodes each comprising processor apparatus for performing parallel further processing of the packets in data stream. For example, the network nodes can provide parallel traffic decapsulation. An example of this is shown in FIG. 5 where data steam 50 is divided by a load balancer 51 between four separate network nodes 52, 53, 54 and 55.

The following will consider how packets may be distributed between cores/independent processing entities. This may be employed to efficiently distribute packets in a flow between cores and/or between multiple network nodes for, for example, replay checking and/or decryption. For clarity and brevity, the following will only refer to distributing checking between cores. However, it is understood that analogous principles also apply to distributing checking/processing data between multiple network nodes and to combinations of at least one core and at least one network node distinct from the at least one core.

In particular, the following describes a mechanism for efficiently distributing the checking to multiple cores in dependence on an identifier comprised within a received packet of a packet flow, wherein the identifier identifies a security association for the packet flow. The identifier is formed to be a function of a sequence number of the received packet. A sequence number is an increasing number (for example, a number incremented by 1 for every packet sent) that indicates a transmission order of the packet in the flow of packets. The sequence number may be used to help protect against replay attacks. There may be a separate counter kept for each security association that counts the received sequence numbers of transmitted packets. Further, the identifier may be formed to also be a function of an original identifier of a security association, such as an initial SPI determined during set-up/initialisation of the security association.

The security association may be between the entity distributing the processing and the entity from which the packet originates. Alternatively or in addition, the security association may be between the entity distributing the processing and the entity from which the packet has most recently been routed.

Figure 7:
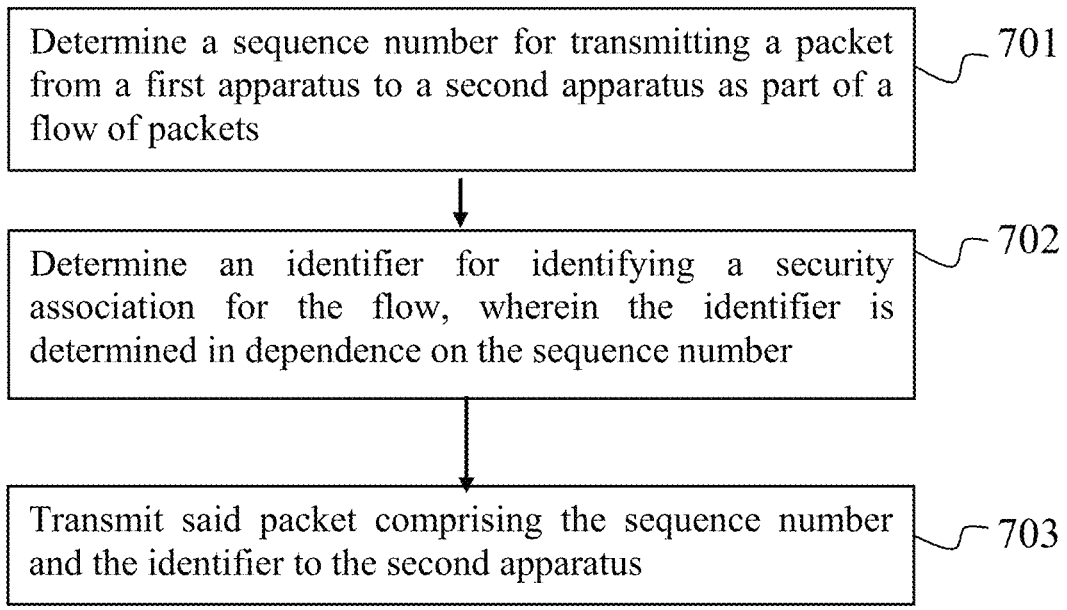
FIGS. 7 and 8 show flowcharts for interacting apparatuses.
Figure 8:
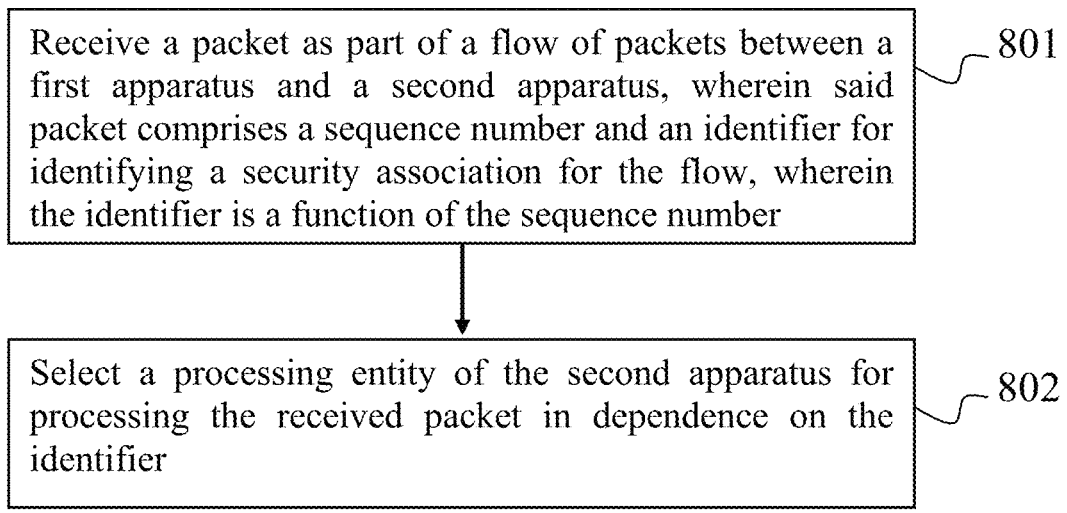

This process is described in the context of the flowcharts of FIGS. 7 and 8, which represent actions performed by transmitter and an interrelated receiver.

FIG. 7 illustrates potential actions by a transmitter.

At 701, a first apparatus is configured to determine a sequence number for transmitting a packet from the first apparatus to a second apparatus as part of a flow of packets.

At 702, the first apparatus is configured to determine an identifier for identifying a security association for the flow, wherein the identifier is determined in dependence on the sequence number. By this, it is meant that the resulting identifier is a function of the sequence number.

At 703, the first apparatus is configured to transmit the sequence number and the identifier to the second apparatus in a packet as part of the flow of packets.

Prior to step 702, the first apparatus and the second apparatus may set up a security association for a flow of packets being received by the second apparatus. Such a security association may be called the security association of the second apparatus. As part of the set up of this security association, an initial identifier of the security association/ may be determined, such as an SPI. The initial identifier of the security association may be used, with the sequence number, to determine the identifier in step 702, such that the determined identifier is a function of both the initial identifier and the sequence number. It is this determined identifier which may be transmitted to the second apparatus at step 703. The determined identifier may be transmitted in the field traditionally reserved for the initial identifier/SPI, and so may be known as an effective SPI.

FIG. 8 illustrates potential actions by a receiver to the interrelated transmitter of FIG. 7.

At 801, the second apparatus is configured to receive the packet transmitted at 703 as part of a flow of packets between the first apparatus and the second apparatus. As discussed above, said packet comprises a sequence number and an identifier for identifying a security association for the flow, wherein the identifier is a function of the sequence number. Further as discussed above, the identifier may also be a function of the initial identifier. Thus, prior to step 801, there may comprise a step of initialising a security association of the second apparatus, which includes determining the above-mentioned initial identifier. Further, the transmitted identifier may be transmitted in a packet field that is designated as being for the initial identifier. In other words, the identifier that is a function of the sequence number and the initial identifier may replace the initial identifier in packets of the flow.

The second apparatus may be configured to distribute received packets in the flow to a plurality of processing entities for processing the received flow of packets. The plurality of processing entities (herein described as processing entities of the second apparatus) may be comprised within the second communication apparatus, and/or be distributed external to the second communication apparatus.

In order to distribute the received packets, at 802, the second apparatus is configured to select a processing entity of the second apparatus for processing the received packet in dependence on the received identifier. Thus the second communication device may be configured to select for each received packet in the flow of packets, a single processing entity to distribute the received packet to. The packet is then distributed to the selected processing entity. Although a single processing entity is selected for a particular received packet, it is understood that other received packets may be passed to that single processing entity. Once distributed, the selected processing entity may perform checks on the received packet, such as those described above in relation to FIGS. 3 and 4.

Where the packet is transmitted using the Encapsulating Security Payload (ESP) format, the identifier may transmitted in the same field reserved for transmitting the SPI. As an example, the following will consider the transmitted/received identifier as being the effective SPI, as it is transmitted in this field as part of the flow of packets. However, it is understood that this example is not limiting to the transmitted/received identifier always being transmitted in this field.

As the identifier is a function of a variable input (the sequence number) and is also used to identify a security association, there thus exists several identifiers in the presently described mechanism that may identify the same security association. In other words, a single security association may be identified by multiple SPIs in accordance with the present teachings. Care is therefore taken for both replay prevention and Initialisation Vector generation when distributing the checking.

By distributing the checking based on the identifier, the above-described mechanism may be backwards-compatible with pre-existing mechanisms for distributing the checking. As the identifier is a function of the sequence number, this may aid in the efficiency for performing checks (such as for replay prevention, as described herein). Moreover, as the distribution is performed on a variable/varying identifier, there may be a more equal distribution of processing load amongst the plurality of processing entities of the second apparatus, such as the round-robin approach described below, compared to situations in which the distribution was based on a static SPI/single SPI per Security Association. This helps to avoid the build-up of bottlenecks in the system. Consequently, the efficiency of the overall system is improved.

Two examples of distributing the checking are considered: the use of a single SPI sequence and the use of multiple SPI sequences.

For single sequence SPI distribution, the lowest N bits of an effective SPI are used to distribute the received packets $N^2$ ways. In this example, a mapping method of sequence number-to-effective SPI is used to map each sequence number to a certain effective SPI in the spread. One of the most straightforward methods for this (although others may be used) is to set the lowest N bits of the effective SPI to equal to N lowest bits of the sequence number. This may result in a round-robin distribution of the received ESP packets over the $N^2$ SPIs. Other methods may be used, such as setting the lowest N bits of the effective SPI to equal the inverse of the N lowest bits of the sequence number.

Upon receiving such packets (where the lowest N bits are equal), all effective SPIs of the distribution may be mapped to the same security association by masking out the lowest N bits of the SPI.

In the above examples of FIGS. 3 and 4, a check window for performing replay prevention checks was used on the sequence number. This may be implemented in several ways in the presently described mechanism. These are described with reference to a core index, which is a value identifying a particular core/processing entity.

In one example, where the lowest N bits of the effective SPI are equal to the lowest N bits of the sequence number and the N lowest bits represents a core index, there being multiple core indices for each processing index, a check window for replay prevention may be applied to the lowest N bits of the effective SPI instead of sequence number. Consequently, for replay prevention, the receiving entity may first check that the lowest N bits of the effective SPI of the received packet matches the lowest N bits of the sequence number of the received packet match (or whatever portion of the sequence number is replicated in the effective SPI). An SPI-specific replay window may then be used to detect duplicates (as described above in relation to the sequence number of FIGS. 3 and 4). If further investigations need to be performed, the sequence number may be checked. However, as the lowest N bits of the effective SPI are already matched to the sequence number and have already been checked, only the highest 32-N bits of the sequence number (or, more generally, the highest M-N bits of the sequence number, where M is the total length of the sequence number) need to be investigated for replay prevention analysis, rendering replay-prevention more efficient.

As another example, where the N lowest bits of the effective SPI are the same as the N lowest bits of the sequence number and the N lowest bits represents a core index, there being a single core index for each processing index, explicit checking for replay prevention may be performed on only the highest 32-N bits of the sequence number (or, more generally, the highest M-N bits of the sequence number, where M is the total length of the sequence number).

For multiple sequence SPI distribution, there are multiple SPI base sequences in use for each Security Association. To achieve this, either the multiple SPIs associated with a single Security Association have to have a different key material (which may be achieved by mutating the original Security Association key in a predetermined way for each of the multiple associated SPIs), and/or a unique sequence space needs to be created for each associated SPI.

One way of obtaining a unique sequence space for this purpose would be to set the highest N bits of each effective SPI equal to the lowest N bits of the sequence number, with the 32-N lowest bits of each effective SPI being the same for each security association. If a unique sequence space is established in this manner, the encrypting entity/core may be arranged to share the SPIs amongst the encrypting cores of the transmitter. This is to obscure which encrypting entity encrypts each packet in the flow.

Figure 6:
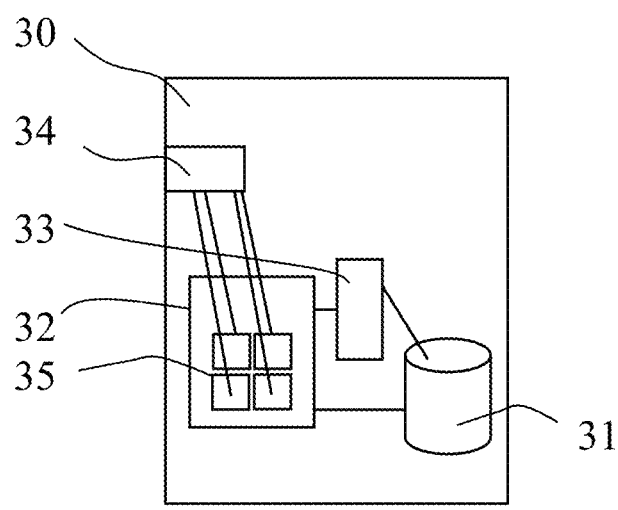
FIG. 6 shows data processing apparatus.

FIG. 6 shows an example of control apparatus for an apparatus capable of providing the above described functions of distributing and analysing packets based on their sequence numbering. The control apparatus 30 can be, for example, integrated with, coupled to and/or otherwise controlling any of the apparatus 10, 12 and/or 13 of FIG. 1 or nodes 51-55 of FIG. 5. For this purpose the control apparatus comprises at least one memory 31, at least one data processing unit 32, 33 and an input/output interface 34. Via the interface the control apparatus can be coupled to the data network. The input/output interface 34 may be a network interface card that is configured to distribute incoming packets to respective cores 35. The control apparatus can be configured to execute an appropriate software code to provide the control functions. The control apparatus can also be interconnected with other control entities. In this example processor 32 is shown to provide four cores 35. However, it is possible to have a multiple of processors providing the cores and/or a larger number of cores. Moreover, in the illustrated example, the input/output interface 34 is shown distributing the incoming packet directly to respective cores 35 via respective interfaces. It is understood that the incoming packets may be distributed to their respective cores 35 for parallel processing in any other way, such as by another entity performing the distribution.

The various embodiments and their combinations or subdivisions may be implemented as methods, apparatuses, or computer program products. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. The memory or memories may be of any type suitable to the local technical environment and may be implemented using any suitable data storage technology, such as semiconductor based memory apparatus, magnetic memory apparatus and systems, optical memory apparatus and systems, fixed memory and removable memory.

According to an embodiment there is provided a computer program comprising code means adapted to perform, when the program is run on processor apparatus, the above described methods.

While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing apparatus, or some combination thereof.

The foregoing description provides by way of exemplary and non-limiting examples a full and informative description of exemplary embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the spirit and scope of this disclosure.

The invention claimed is:

1. A method comprising:
    determining a sequence number for transmitting a packet from a first apparatus to a second apparatus as part of a flow of packets;
    determining a flow identifier for identifying a security association for the flow, wherein the flow identifier is determined in dependence on the sequence number; and
    transmitting said packet comprising the sequence number and the flow identifier to the second apparatus;
    wherein said determining a flow identifier comprises at least one of setting the n least significant bits of the flow identifier as a function of the n most significant bits of the sequence number, and determining the flow identifier in dependence on an original identifier of the security association that was determined when the security association was initialised.

2. The method as claimed in claim 1, wherein said determining a flow identifier comprises setting the n least significant bits of the flow identifier as a function of the n least significant bits of the sequence number.

3. The method as claimed in claim 2, comprising determining n, wherein n is a function of a number of independent processing entities in the second apparatus that are arranged to process the flow.

4. A method comprising:
    receiving a first packet as part of a flow of packets between a first apparatus and a second apparatus, wherein said first packet comprises a sequence number and a flow identifier for identifying a security association for the flow, wherein the flow identifier is a function of the sequence number; and
    selecting a processing entity of the second apparatus for processing the first packet in dependence on the flow identifier;
    wherein said flow identifier of the first packet is a function of an original identifier of the security association that was determined when the security association was initialised.

5. The method as claimed in claim 4, wherein the n least significant bits of the sequence number or the n most significant bits of the sequence number are a function of the n least significant bits of the flow identifier.

6. The method as claimed in claim 5, wherein said selecting comprises selecting a processing entity out of m independent processing entities in the second apparatus that are arranged to process the flow.

7. The method as claimed in claim 5, wherein the second apparatus comprises the selected processing entity, the method further comprising:
- receiving a second packet as part of the flow of packets, wherein said second packet comprises a sequence number and a flow identifier for identifying the security association, wherein the flow identifier of the second packet is a function of the sequence number of the second packet;
- selecting the processing entity of the second apparatus for processing the second packet in dependence on the flow identifier; and
- checking, by the selected processing entity, all bar the n least significant bits of the sequence number comprised within the first packet to all bar the n least significant bits of the sequence number comprised within the second packet.

8. An apparatus comprising at least one processor and at least one memory comprising computer code that, when executed by the at least one processor, causes the apparatus to:
- determine a sequence number for transmitting a packet from a first apparatus to a second apparatus as part of a flow of packets;
- determine a flow identifier for identifying a security association for the flow, wherein the flow identifier is determined in dependence on the sequence number; and
- transmit said packet comprising the sequence number and the flow identifier to the second apparatus;

configure to determine the flow identifier in dependence on an original identifier of the security association that was determined when the security association was initialised.

9. The apparatus as claimed in claim 8, configured to set the n least significant bits of the flow identifier as a function of the n least significant bits of the sequence number.

10. An apparatus comprising at least one processor and at least one memory comprising computer code that, when executed by the at least one processor, causes the apparatus to:
- determine a sequence number for transmitting a packet from a first apparatus to a second apparatus as part of a flow of packets;
- determine a flow identifier for identifying a security association for the flow, wherein the flow identifier is determined in dependence on the sequence number; and
- transmit said packet comprising the sequence number and the flow identifier to the second appartus;

determine the flow identifier in dependence on an original identifier of the security association that was determined when the security association was initialised.

11. The apparatus as claimed in claim 8, configured to set the n least significant bits of the flow identifier as a function of the n most significant bits of the sequence number.

12. An apparatus comprising at least one processor and at least one memory comprising computer code that, when executed by the at least one processor, causes the apparatus to:
- receive a first packet as part of a flow of packets between a first apparatus and a second apparatus, wherein said first packet comprises a sequence number and a flow identifier for identifying a security association for the flow, wherein the flow identifier is a function of the sequence number; and
- select a processing entity of the second apparatus for processing the first packet in dependence on the flow identifier;

wherein said flow identifier of the first packet is a function of an original identifier of the security association that was determined when the security association was initialised.

13. The apparatus as claimed in claim 12, wherein the n least significant bits of the sequence number or the n most significant bits of the sequence number are a function of the n least significant bits of the flow identifier.

14. The apparatus as claimed in claim 13, configured to select a processing entity out of n independent processing entities in the second apparatus that are arranged to process the flow.

15. The apparatus as claimed in claim 13, wherein the second apparatus comprises the selected processing entity, the apparatus being configured to:
- receive a second packet as part of the flow of packets, wherein said first packet comprises a sequence number and a flow identifier for identifying the security association, wherein the flow identifier of the second packet is a function of the sequence number of the second packet;
- select the processing entity of the second apparatus for processing the first packet in dependence on the flow identifier; and
- check, by the selected processing entity, all bar the n least significant bits of the sequence number comprised within the first packet to all bar the n least significant bits of the sequence number comprised within the second packet.

16. A non-transitory computer readable media comprising program code for causing a processor to perform instructions for a method in a computerized network, the method performed comprising:
- determining a sequence number for transmitting a packet from a first apparatus to a second apparatus as part of a flow of packets;
- determining a flow identifier for identifying a security association for the flow, wherein the flow identifier is determined in dependence on the sequence number; and
- transmitting said packet comprising the sequence number and the flow identifier to the second apparatus;

wherein said determining a flow identifier comprises at least one of setting the n least significant bits of the flow identifier as a function of the n most significant bits of the sequence number, and determining the flow identifier in dependence on an original identifier of the security association that was determined when the security association was initialised.

17. A non-transitory computer readable media comprising program code for causing a processor to perform instructions for a method in a computerized network, the method performed comprising:
- receiving a first packet as part of a flow of packets between a first apparatus and a second apparatus, wherein said first packet comprises a sequence number and a flow identifier for identifying a security association for the flow, wherein the flow identifier is a function of the sequence number; and
- selecting a processing entity of the second apparatus for processing the first packet in dependence on the flow identifier;

wherein said flow identifier of the first packet is a function of an original identifier of the security association that was determined when the security association was initialised.

* * * * *